US007592935B2

(12) United States Patent
Cadambi et al.

(10) Patent No.: US 7,592,935 B2
(45) Date of Patent: Sep. 22, 2009

(54) INFORMATION RETRIEVAL ARCHITECTURE FOR PACKET CLASSIFICATION

(75) Inventors: Srihari Cadambi, Cherry Hill, NJ (US); Srimat T Chakradhar, Manalapan, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 597 days.

(21) Appl. No.: 11/276,665

(22) Filed: Mar. 9, 2006

(65) Prior Publication Data
US 2006/0209725 A1 Sep. 21, 2006

Related U.S. Application Data

(60) Provisional application No. 60/594,096, filed on Mar. 10, 2005.

(51) Int. Cl.
*H03M 7/00* (2006.01)
(52) U.S. Cl. .............................. 341/106; 341/50; 341/51
(58) Field of Classification Search ................. 341/106, 341/50, 51, 63, 60; 380/286; 707/1, 3
See application file for complete search history.

(56) References Cited

U.S. PATENT DOCUMENTS

| 5,371,499 | A | * | 12/1994 | Graybill et al. ................ 341/51 |
| 5,951,651 | A | | 9/1999 | Lakshman et al. |
| 6,160,891 | A | * | 12/2000 | Al-Salqan .................... 380/286 |
| 6,236,341 | B1 | * | 5/2001 | Dorward et al. ................ 341/60 |
| 6,289,013 | B1 | | 9/2001 | Lakshman et al. |
| 6,341,130 | B1 | | 1/2002 | Lakshman et al. |
| 6,449,256 | B1 | * | 9/2002 | Varghese et al. ............ 370/238 |
| 6,611,213 | B1 | * | 8/2003 | Bentley et al. ................ 341/51 |
| 2002/0143755 | A1 | * | 10/2002 | Wynblatt et al. ............... 707/3 |
| 2003/0198224 | A1 | * | 10/2003 | Lee et al. ..................... 370/392 |
| 2005/0018668 | A1 | | 1/2005 | Cheriton |
| 2005/0187898 | A1 | * | 8/2005 | Chazelle et al. ................ 707/1 |

OTHER PUBLICATIONS

Gupta, P. et al., "Algorithms for Packet Classification", IEEE Network 15(2), Mar./Apr. 2001.
Overmars, M. et al., "Range Searching and Point Location Among Fat Objects", Journal of Algorithms 021, Article No. 0063, 1996.
Srinivasan, V. et al., "Fast and Scalable Layer Four Switching", ACM SIGCOMM Computer Communication Review, Proceedings of the ACM SIGCOMM'98 Conference on Applications, Technologies, Architectures and Protocols for Computer Communication, 1998.
Tsai, M-J. et al., "Stack-Run Coding for Low Bit Rate Image Communication", in International Conference on Image Processing, 1996.

(Continued)

*Primary Examiner*—Jean B Jeanglaude
(74) *Attorney, Agent, or Firm*—Joseph J. Kolodka

(57) ABSTRACT

An information retrieval architecture for performing a multi-dimensional search for a lookup value associated with a set of input values, the set of input values organized into one or more fields, the information retrieval architecture including a plurality of classification modules, each classification module storing the lookup values, each lookup value being associated with a set of input values; and a preprocessing module which receives a set of input values and selectively limits search of the plurality of classification modules to a subset of the classification modules.

12 Claims, 10 Drawing Sheets

OTHER PUBLICATIONS

Chazelle, B. et al., "The Bloomier Filter: An Efficient Data Structure for Static Support Lookup Tables", Proceedings, Symposium on Discrete Algorithms, 2004.

Bloom, B.H. "Space/Time Trade-Offs in Hash Coding with Allowable Errors", Communications of the ACM, Jul. 1970.

Broder, A. et al., "Network Applications of Bloom Filters: A Survey", in Proceedings of the 40th Annual Allerton Conference, Oct. 2002.

Dharmapurikar, S. et al., "Longest Prefix Matching Using Bloom Filters", in Proceedings of the 2003 Conference on Application, Technologies, Architectures and Protocols for Computer Communications, Aug. 2003.

Kobayashi, M. et al., "A Longest Prefix Match Search Engine for Multi-Gigabit IP Processing", IEEE International Conference on Communications, 2000.

Lampson, B. et al., IP Lookups Using Multiway and Multicolumn Search, IEEE/ACM Transactions on Networking, vol. 7, No. 3, Jun. 1999.

Liu, H., "Reducing Routing Table Size Using Ternary-CAM", in Hot Interconnects 9, 2001.

Mansour, M. et al., "FPGA-Based Internet Protocol Version 6 Router", in Computer Design: VLSI in Computers and Processors 1998.

Waldvogel, M. et al., "Scalable High Speed IP Routing Lookups", in ACM SIGCOMM Computer Communication Review, 1997.

Prakash, A. et al., "A Middle Ground Between CAMs and DAGs for High-Speed Packet Classification", in Proceedings of the 10th Symposium on High Performance Interconnects Hot Interconnects, 2002.

Sangireddy, R. et al., "High-Speed IP Routing with Binary Decision Diagrams Based Hardware Address Lookup Engine", in IEEE Journal on Selected Areas in Communications, vol. 21, No. 4, May 2003.

Taylor, D.E. et al., "Scalable IP Lookup for Programmable Routers", IEEE Infocom, 2002.

Gupta, P. et al., "Near-Optimal Routing Lookups with Bounded Worst Cast Performance", IEEE Infocom, 2000.

Eck, D., "Access Control Lists to Protect a Network from Worm/Dos Attacks", SANS Institute GIAC Practical Repository, 2003.

Technologies S., SiberCAM Ultra-18M SCT1842, 2002.

Feldman, A. et al., "Tradeoffs for Packet Classification", IEEE Infocom, 2000.

Gupta, P. et al., "Classifying Packets with Hierarchical Intelligent Cuttings", IEEE Micro Jan./Feb. 2000.

Srinivasan, V., "A Packet Classification and Filter Management System", IEEE Infocom 2001.

Van Lunteren, J. et al., "Fast and Scalable Packet Classification", IEEE Journal Selected Areas in Communications, May 2003.

Baboescu, F. et al., "Scalable Packet Classification", IEEE/ACM Transactions on Networking, Feb. 2005.

Taylor, D.E. et al., "Scalable Packet Classification Using Distributed Crossproducting of Field Labels", IEEE Infocom 2005.

Zheng, K. et al., "TCAM-based Distributed Parallel Packet Classification Algorithm with Range-Matching Solution", IEEE Infocom 2005.

Taylor, D.E. et al., "ClassBench: A Packet Classification Benchmark", IEEE Infocom 2005.

Zane, F. et al., "CoolCAMs: Power-Efficient TCAMs for Forwarding Engines", IEEE Infocom 2003.

Laksham, T.V. et al., "High-Speed Policy-based Packet Forwarding Using Efficient Multi-dimensional Range Matching", ACM SIGCOMM, Sep. 1998.

Srinivasan, V. et al., "Packet Classification Using Tuple Space Search", ACM SIGCOMM, Sep. 1999.

Singh, S. et al., "Packet Classification Using Multidimensional Cutting", ACM SIGCOMM 2003.

Eatherton, W. et al., "Tree Bitmap: Hardware/Software IP Lookups with Incremental Updates", ACM SIGCOMM Computer Communications Review, Apr. 2004.

Taylor, D.E, "Survey and Taxonomy of Packet Classification Techniques", Applied Research Laboratory, Department of Computer Science and Engineering, May 2004.

* cited by examiner (A)

(B)

(A)

(B)

(C)

(A)

(B)

(A)

(B)

INFORMATION RETRIEVAL ARCHITECTURE FOR PACKET CLASSIFICATION

This application claims the benefit of and is a non-provisional of U.S. Provisional Patent Application Ser. No. 60/594,096, entitled "INFORMATION RETRIEVAL ARCHITECTURE FOR HANDLING ACCESS CONTROL LISTS," filed on Mar. 10, 2005, the contents of which are incorporated by reference herein.

This application is also related to U.S. application Ser. No. 10/909,907, entitled "CONTENT-BASED INFORMATION RETRIEVAL ARCHITECTURE," filed on Aug. 2, 2004, and to U.S. Provisional Application No. 60/740,114, entitled "A STORAGE-EFFICIENT, COLLISION-FREE HASH-BASED PACKET PROCESSING ARCHITECTURE," filed on Nov. 28, 2005, both of which are also incorporated by reference herein.

BACKGROUND OF THE INVENTION

The present invention relates to architectures for fast information retrieval and, more particularly, to the design of architectures for packet classification.

Multi-dimensional search problems such as packet classification pose a number of challenges. Packet classifiers, for example, typically consist of a set of rules that are applied to an incoming packet-where each packet must be classified based on several different fields in the packet header, e.g., source and destination address, protocol, port, etc. Packet classification in its fullest generality has been shown to require exponential complexity in either time or space. Hence, current efforts use heuristics in an effort to provide a feasible solution in practical real-world situations. The favored commercial solution for packet classification is the ternary content-addressable memory (TCAM). TCAMs are specialized memories that simultaneously compare a query with all stored entries and have guaranteed constant search latencies. While TCAMs have advantages over other existing hardware and software solutions, TCAMs are expensive and do have scalability issues: as classifiers grow in size, their power dissipation becomes prohibitive and their performance can degrade, i.e., the latency of a search, while deterministic and independent of classifier properties, can increase.

Accordingly, there is a need for an improved information retrieval architecture for handling such multi-dimensional search problems.

SUMMARY OF INVENTION

An information retrieval architecture is herein disclosed which can handle multi-dimensional search problems such as packet classification. The information retrieval architecture takes advantage of fast hash-based cells which can perform high speed lookups in a constant query time. The information retrieval architecture comprises a plurality of matching cells, each matching cell performing high-speed matching on a sub-problem of the full multi-dimensional search problem. For example, a packet classifier can be split into individual fields, each field assigned a set of matching cells designated as a group to perform longest prefix matching for the field in accordance with the rules in the packet classifier. The matching cells can be arranged in groupings of different prefix lengths. The results from each one-dimensional longest prefix matching search can be combined to form a cross-product. A lookup can be performed on a cross-product table to retrieve the final output value, which, in the case of a packet classifier, would be a rule identifier and possibly an associated action with the rule identifier. The cross-product table can be implemented using slow external memory, but, preferably includes a cross-product cell implemented using the above-mentioned hash-based design to provide fast lookups for frequently accessed cross-products. The disclosed architecture advantageously can be implemented using inexpensive low-power conventional memory components and can provide for low latencies per lookup.

A hybrid information retrieval architecture is also disclosed which, while utilizing existing classification modules such as ternary content addressable memories, can advantageously reduce accesses to the classification modules. A preprocessing module is provided which receives a set of input values and selectively limits search of the classification modules to subset of the classification modules. The preprocessing module uses the above-mentioned hash-based lookup architecture to provide lookup structures which, based on the set of input values, can quickly retrieve a data representation identifying which of the plurality of classifiers need to be searched in order to retrieve the lookup value associated with the set of input values. The data representation, for example, can be bitmap, where each bit represents a different classification module. A lookup structure can be provided for each field of input values, and the bitmaps retrieved by each lookup structure can be combined, e.g., using a bit-wise AND operation, to generate a list of all classification modules which need to be searched. The preprocessing module can default to a data representation identifying that all of the plurality of classification modules are to be searched for the lookup value associated with the input values. The preprocessing module, thereby, can maintain correct operation and advantageously perform no worse than a conventional parallel search of all of the classification modules. Since the preprocessing module does not need to store all possible combinations of input values, the preprocessing module can limit storage of data representations to those more likely to be accessed or can use a single lookup structure for different fields of input values so as to take advantage of the number of unique input values for the different fields of input values. As in the embodiment above, the disclosed architecture is particularly advantageous for packet classification where the lookup values are packet classification rules and where the input values are packet header information. When used with TCAMs, the disclosed architecture can provide improvements in scalability with regard to power and performance.

These and other advantages of the invention will be apparent to those of ordinary skill in the art by reference to the following detailed description and the accompanying drawings.

DETAILED DESCRIPTION

Figure 1:
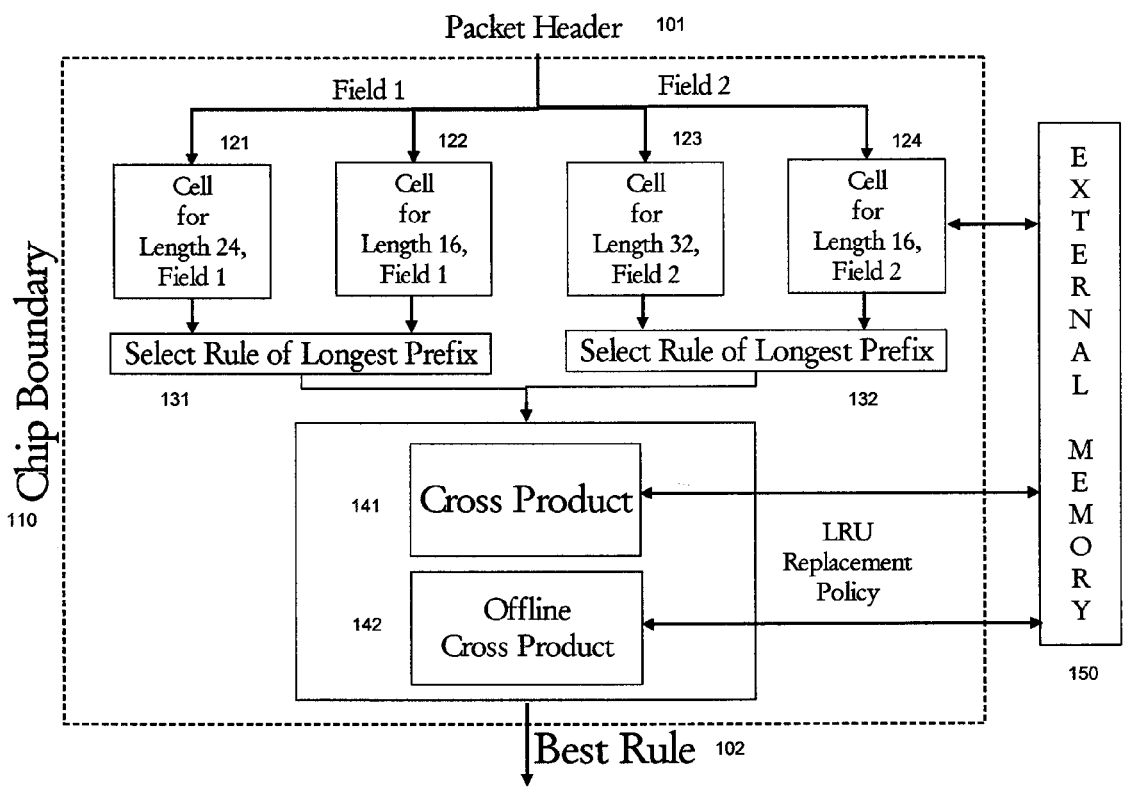
FIG. 1 is a block diagram of an embodiment of an information retrieval architecture.

FIG. 1 is a block diagram of an embodiment of an information retrieval architecture. The information retrieval architecture is designed to handle a multi-dimensional search problem, which for illustration purposes herein is a packet classification problem. As depicted in FIG. 1, a set of input values 101 in the form of a packet header is received and processed by the architecture. Based on the processing of the input values 101, the architecture outputs a "best" lookup value 102, e.g., in the form of a packet classification rule.

Figure 5:
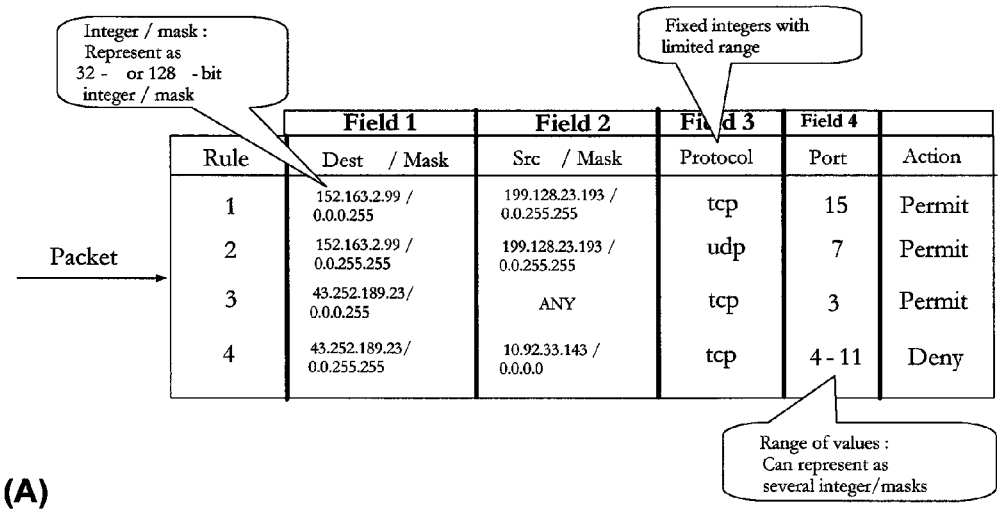
FIG. 5A through 5C illustrates an example packet classifier and how the packet classifier is processed for storage in the information retrieval architecture.
Figure 5:
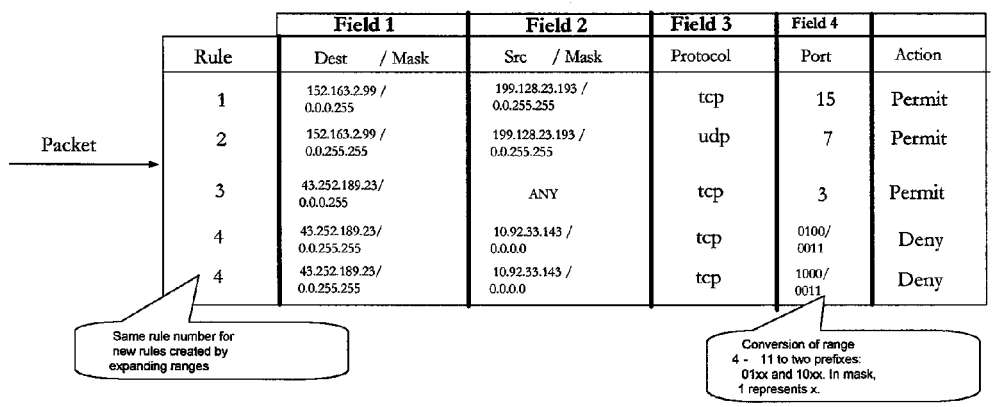
Figure 5:
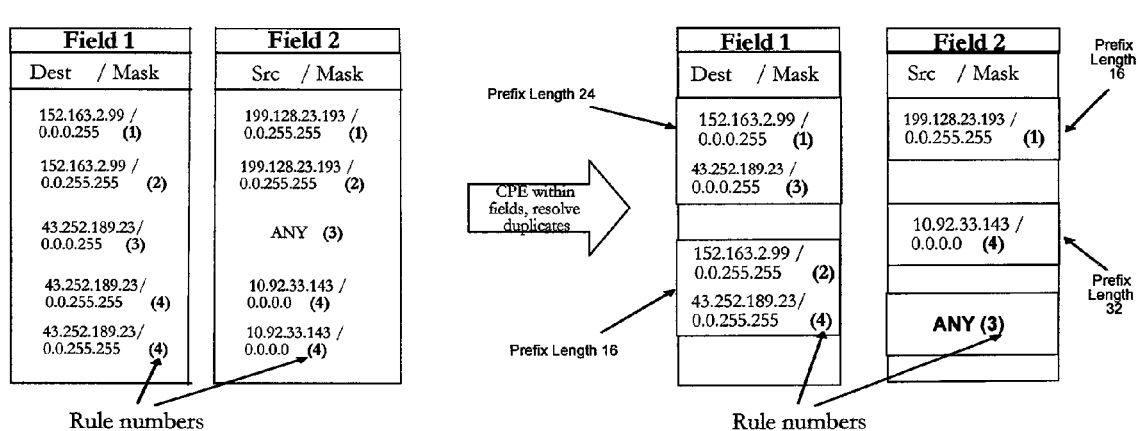

A packet classifier is assumed to have N rules and an action associated with each rule. The rules are given priorities, typically expressed by the order of the rules in the packet classifier, e.g., the first rule having highest priority and the last rule having lowest priority. Each rule R has one or more fields, each field corresponding to fields of information in the packet header 101. It is assumed that the packet classifier herein has D fields. The portion of a rule that belongs to a field is referred to herein as an "entry." Each entry i includes an expression $E_i$ of what information in a packet header matches the entry. An i'th field of a packet header H is said to match an entry of rule R if the i'th field of H matches the expression $E_i$ in the entry. The packet is said to match the rule R if, for all i, the i'th field in the packet header matches the expression $E_i$. Typical packet classifiers use rule entries expressed as a value (usually an integer value) and an accompanying mask. The discussion herein shall focus, without limitation, on prefix matching, where a prefix of length L is an entry whose L most significant bits are valid, while all other bits are masked. The number of valid bits in a prefix is referred to as the prefix length. FIG. 5A shows an illustrative packet classifier. Note that all entries, including the integer range expression in field 4 of rule 4 in FIG. 5A can be converted into a series of integers and masks. Thus, FIG. 5B shows how the integer range may be expanded into two rules (with the same rule number), thereby reducing it to the form of an integer-mask representation. It is assumed herein for description purposes that all rules have entries that are represented by an expression in the form of an integer and a mask.

Figure 2A:
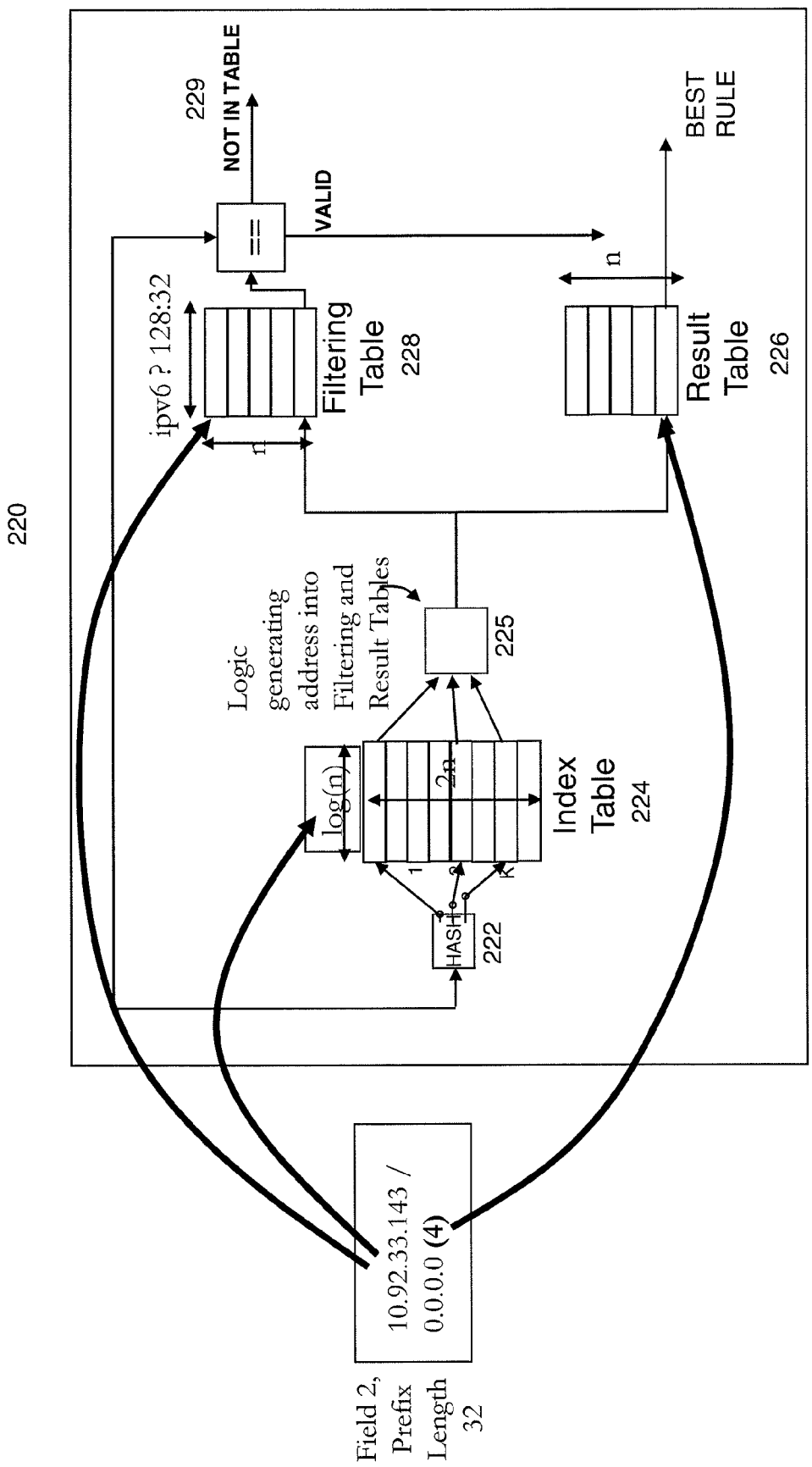
FIG. 2A is a diagram of the structure of an illustrative matching cell.

The information retrieval architecture in FIG. 1 comprises a plurality of matching cells 121, 122, 123, 124, each cell performing matching on a sub-problem of the full multi-dimensional search problem. Each matching cell is preferably implemented using a content-based information retrieval architecture as disclosed in U.S. application Ser. No. 10/909,907, entitled "CONTENT-BASED INFORMATION RETRIEVAL ARCHITECTURE," filed on Aug. 2, 2004, and in U.S. Provisional Application No. 60/740,114, entitled "A STORAGE-EFFICIENT, COLLISION-FREE HASH-BASED PACKET PROCESSING ARCHITECTURE," filed on Nov. 28, 2005, both of which are incorporated by reference herein. FIG. 2A shows an example of the structure of a matching cell 220, in accordance with this hash-based design which provides high speed lookups with a constant query time. As depicted in FIG. 2A, the matching cell comprises a hashing module 222, an index table 224 of encoded values, and a result table 226 of lookup values. An input value is hashed to generate a plurality of hashed values, the hashed values corresponding to locations of encoded values in the index table. The encoded values obtained from the input value encode an output value such that the output value cannot be recovered from any single encoded value. The output value selects a lookup value stored in the result table 226, the lookup value being the lookup value "matching" the input value. A third filtering table 228 can also be added, as depicted in FIG. 2A, to filter out possible false positives. Additional structures can also be added, in accordance with the disclosures above, to provide wildcard support and to provide fast updates.

Each matching cell can be used to store prefixes of a predetermined length with associated rule identifiers. The packet classifier is split into D individual fields, each field assigned a set of matching cells designated to handle different prefix lengths. For example, FIG. 1 depicts prefix matching cells 121, 122 assigned to field 1 while prefix matching cells 123, 124 are assigned to field 2. Each prefix matching cell receives a lookup value from the assigned field in the packet header 101 and, after performing the lookup, outputs an associated rule identifier. The outputs of the different prefix matching cells are fed to selectors 131, 132 which select the output of the cell corresponding to the longest prefix length. In other words, the output of the prefix matching cells, after selection for each field is the rule corresponding to the longest matching prefix.

The results from each one-dimensional longest prefix matching search forms what is referred to herein as a "cross-product." A cross-product is a tuple <$R_1, R_2 \ldots R_D$>, where $R_i$ is a rule and D is the number of fields. The cross-products can be mapped to an output rule by evaluating the intersection of the rule dependency sets and using the packet classifier priorities to find the "best" rule. A prefix $P_i$ is said to "depend" on a prefix $P_j$ if every expression that matches $P_i$ also matches $P_j$. If an expression H matches $P_i$, then H matches all prefixes that $P_i$ depends on, i.e., all shorter, dependent prefixes. Within field f a rule $R_i$ is said to depend on a rule $R_j$ if the prefix corresponding to $R_i$ within field f depends on the prefix corresponding to $R_j$ within field f. This is denoted herein by $R_i \rightarrow R_j$. Within a field, the "dependent set" of rule R is the set of rules that R depends upon. If an expression matches multiple prefixes within a field, the rules corresponding to all those prefixes form a dependent set. The rule corresponding to the longest prefix is called the "representative rule." Using the representative rule, it is possible to extract all rules that the expression matched within a field. A cross-product <$R_1, R_2 \ldots R_D$> is said to be "valid" if the intersection of the dependent sets of the rules $R_1, R_2 \ldots R_D$ is not null. For a packet classifier with N rules and D fields, there are up to $N^D$ cross-products in the worst case; however, the number of valid cross-products is usually much smaller. A cross-product, if valid, implies a unique "best" rule in the packet classifier. The valid cross-products can be inserted into a cross-product table, which can be consulted to identify what rule to output based on a given cross-product.

In FIG. 1, and in accordance with an embodiment of another aspect of the invention, it is advantageous to construct the cross-product table using one or more cross-product cells 141, 142 and an external memory 150. The cross-product cells 141, 142 are again preferably implemented using the content-based information retrieval architecture disclosed in U.S. application Ser. No. 10/909,907 and 60/740,114, as mentioned above. The cross-product cells are used to hold frequently accessed cross-products. Given the potentially large number of cross-products, it is advantageous to store only frequently-accessed cross-products in the fast cross-product cells 141, 142, while using a slower external memory 150 to contain all cross-products. In the worst case, the number of valid cross-products is $N^D$, where N is the number of rules in the ACL, and D the number of fields. For 1000 rules and 4 fields, one could have 1 trillion cross-products, which preferably should not be stored in the limited memory available within the fast lookup cells. The cross-product cells can be thought of as like a cache for the cross-product table, but with a special architecture that provides for constant query time lookup. It is also advantageous to provide for online 141 and offline cross-product cells 142, as depicted in FIG. 1. The online cell 141 can be actively used for lookups, while the offline cell 142 can be used for updates; periodically, the two can be switched.

In addition to being evaluated by a single cross product cell in a monolithic manner, the cross products can also be evaluated by several cross product cells in a hierarchical manner. For instance, consider a D-field cross product CP. The first cross product cell can evaluate a two-field cross product comprising the first two fields of CP. The result of this can be concatenated with the third field of CP to form another two-field cross product evaluated by a separate cell. Thus, D-1 cross product cells are required to evaluate CP. The advantage of this is reduced memory consumption at the expense of latency.

Setup. FIG. 5A through 5C illustrates how to setup the information retrieval architecture, in order to handle a particular packet classifier. For simplicity, the illustration is limited to the first two fields depicted in FIGS. 5A and 5B. As depicted in FIG. 5C, each rule in the packet classifier is broken up into its constituent fields. The packet classifier fields are arranged in groupings of different prefix lengths. The entries can be grouped in a manner that restricts the distinct prefix lengths to a set of k pre-determined prefix lengths $L=\{p_1, p_2 \ldots p_k\}$, where $p_k$ is the largest prefix length in the entire field. Any prefix with a length p' not in L can be expanded to the next largest prefix length in L, i.e., if $p_{i-1}<p'<p_i$, $1 \leq i \leq k$, all prefixes of length p' are expanded to $p_i$. Alternatively, a more refined approach can be utilized which simultaneously collapses and expands prefixes while minimizing the number of prefix lengths dynamically and subject to capacity constraints. See U.S. Utility patent application Ser. No. 11/133,226, entitled "A PREFIX PROCESSING TECHNIQUE FOR FASTER IP ROUTING," filed on May 20, 2005, and Ser. No. 11/133,227, entitled "PREFIX OPTIMIZATIONS FOR A NETWORK SEARCH ENGINE," filed on May 20, 2005, both of which are incorporated by reference herein. It should be noted that k can be determined by other factors other than chip constraints. It should also be noted that controlled prefix expansion does not increase the number of rules since the expanded prefixes still correspond to the same rules. Hence the number of cross-products is not affected by controlled prefix expansion. The process of controlled prefix expansion applied on each of two fields in the packet classifier is illustrated in FIG. 5C. Note that while performing prefix expansion, duplicate prefixes are removed from each field. This is illustrated in FIG. 5C by the resolution of duplicate prefix 199.128.x.x in prefix length 16 of field 2. The rule dependencies are depicted below:

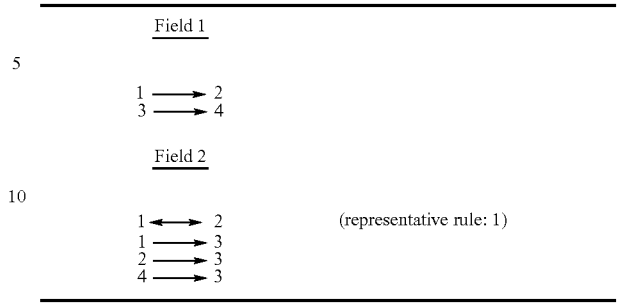

In this example, rule 1 is used as a representative rule for dependent rules 1 and 2 in field 2. This is taken into consideration when the cross-product table is setup.

After prefix expansion, there are at most k prefix lengths in each field. As depicted in FIG. 6A and FIG. 7A, a prefix matching cell is used for each of the k prefix lengths. The outputs of the k prefix matching cells are fed to a selector which selects the valid output of the cell corresponding to the longest prefix length. Note that the packet classifier keyword 'any' is not expanded during prefix expansion. Instead, it can be retained as a special entry. When no prefix in a given field matches a header, then the header is said to match 'any'. Thus, if 'any' is present in a field, a MUX can be added at the output of the prefix matching cell for that field, as shown in FIGS. 6A and 7A. The prefixes along with their corresponding rule numbers are then inserted in the prefix matching cells, as shown in FIGS. 6A and 7A.

Valid cross-products can be computed and inserted into the cross-product cells and the external memory as follows. An examination can be conducted of every possible cross-product, and one can retain only valid ones, i.e., those for which the intersection of the rule dependency sets is not null. Based on inter-dependencies between different prefixes and rules, the number of valid cross-products may be small compared to the total number of cross-products. Nevertheless, given reasonable assumptions about rule dependencies, one cannot take for granted that the number of valid cross-products will indeed be small. However, it is reasonable to expect that there is considerable temporal and spatial locality during packet classifier operation, i.e., certain cross-products will be accessed more frequently than others. One can find the best rule a cross-product corresponds to using rule dependencies within fields. Given a cross-product $<R_1, R_2 \ldots R_D>$, for each $R_i$ where $0<i \geq D$, all dependent rules within field i can be obtained. Then, the intersection of the dependency sets for all fields can be computed. Note that this is a one-time setup process that can be done in software, e.g., by the host or embedded CPU accompanying the cells.

Figure 3:
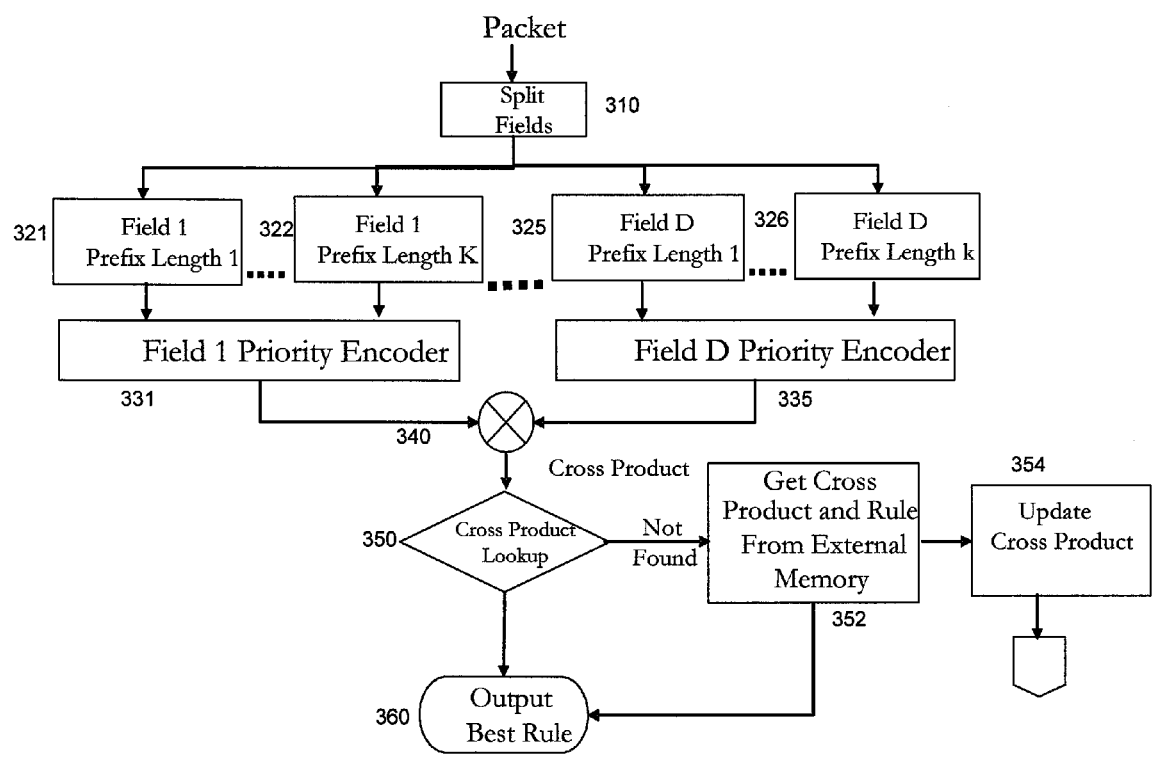
FIG. 3 is a flowchart of processing performed in a lookup operation.

Lookup. FIG. 3 is a flowchart of processing performed in a lookup operation, using the above-mentioned information retrieval architecture. The incoming packet header is split into its constituent fields at step 310. At step 321, 322, . . . 325, 326, the prefix from each field is sent to an appropriate prefix matching cell which, at step 331, . . . 335, produces the longest prefix match for that prefix within that field. At step 340, the outputs from all of the prefix matching cells are concatenated to form a cross-product. At step 350, the cross-product is used to lookup the best rule from the cross-product cell. If found in the cross-product cell, then the best rule is output at step 360. If not found in the cross product cell, an external memory access is performed at step 352 to find the best rule. The cross-product cells can be updated at step 354.

The cross-product cells can be pre-filled or can be filled on demand. For example, the cross-product cells can be initially empty, and when the first packet arrives, the external memory is accessed and the cross-product is added to the cross-product cells. When the cross-product cell is full, least-recently-used (LRU) cross-products can be removed to make room for new ones. During steady-state operation, the cross-products generated by the prefix matching cells pertaining to each field should be answered by the first lookup in the cross-product cell. If the cross-product is found in the cross-product cell, the latency for the overall operation is determined by the cell latencies. If the latency for each cell is approximately 8 cycles (at 250 MHz), the total latency for the operation would be 16 cycles. However, if the cross-product is not found in the cross-product cell, access time for the external memory must be added to the latency. Therefore, a worst-case and common-case latency may be provided.

Figure 4:
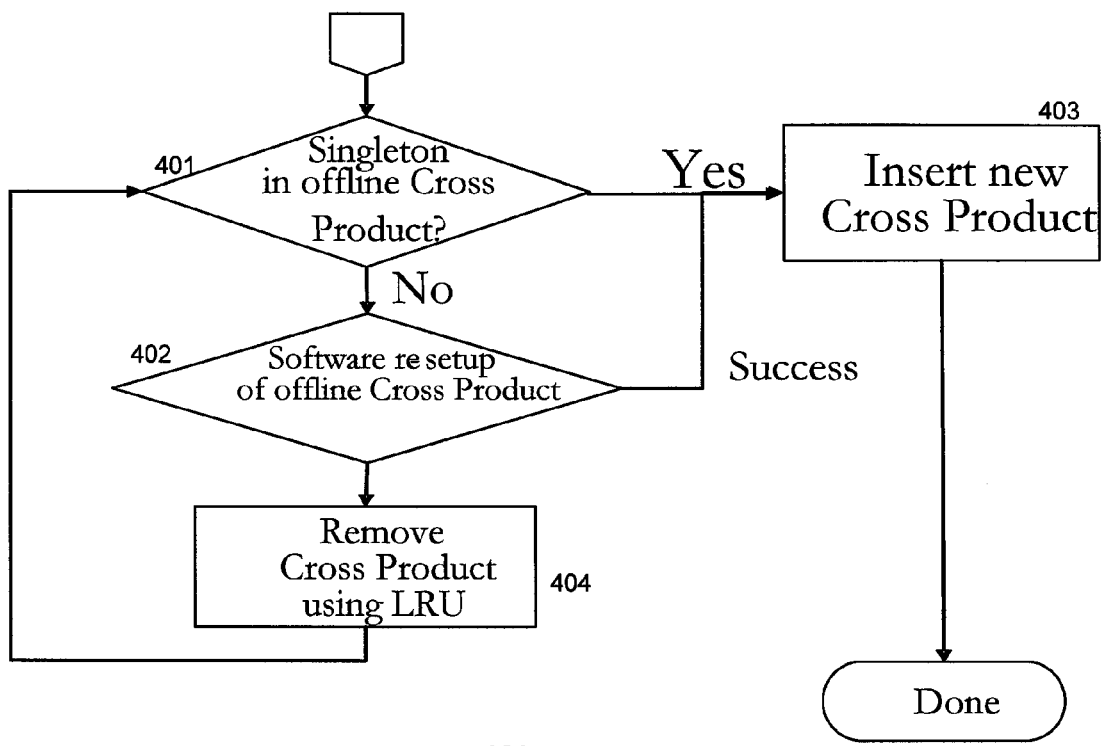
FIG. 4A is a flowchart of processing performed in a cross product update.
FIG. 4B illustrates how the cross products can be stored in a hierarchical memory structure.
Figure 4:
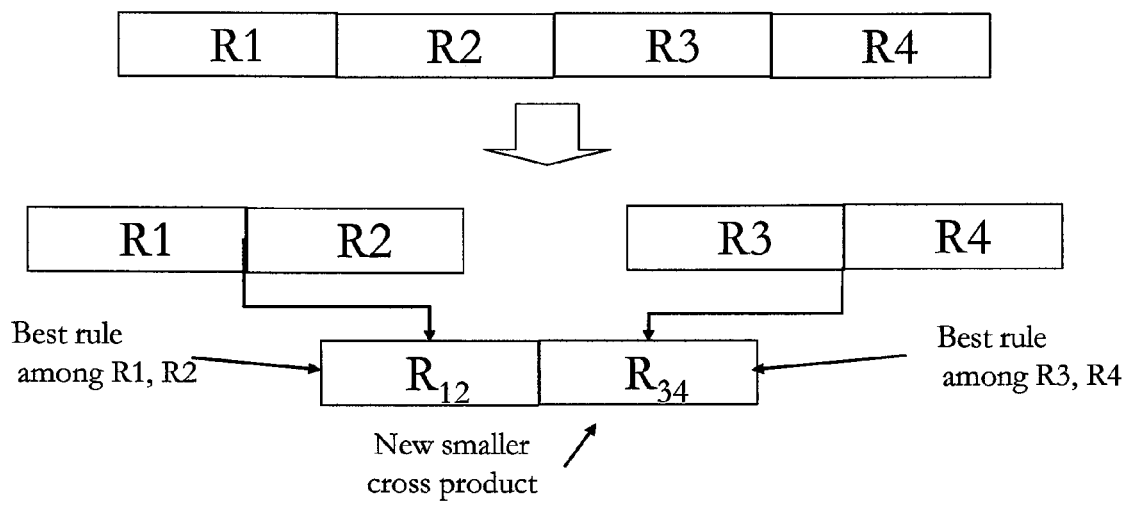

Adding and Removing Cross-products. FIG. 4A is a flowchart of processing performed in adding and removing cross-products from the cross-product cells. It is assumed that the cross-product cell uses the hash-based architecture disclosed in application Ser. No. 10/909,907, as discussed above. A new cross-product is fetched from the external memory. As further described and disclosed therein, additions to a cell are easy if the new element has a "singleton," i.e., a hash value that is unique form the hash values of all the other elements in the cell. If the new entry has a singleton at step 401, addition is trivial and can be performed at step 403. If not, then an attempt can be made to resetup the offline cross-product cell at step 402. Otherwise, the least recently used cross-products can be removed from the cell at 404 until a singleton location is created, after which the new entry can be added. The offline and online cross-product cells can be switched periodically, as mentioned above.

Figure 2B:
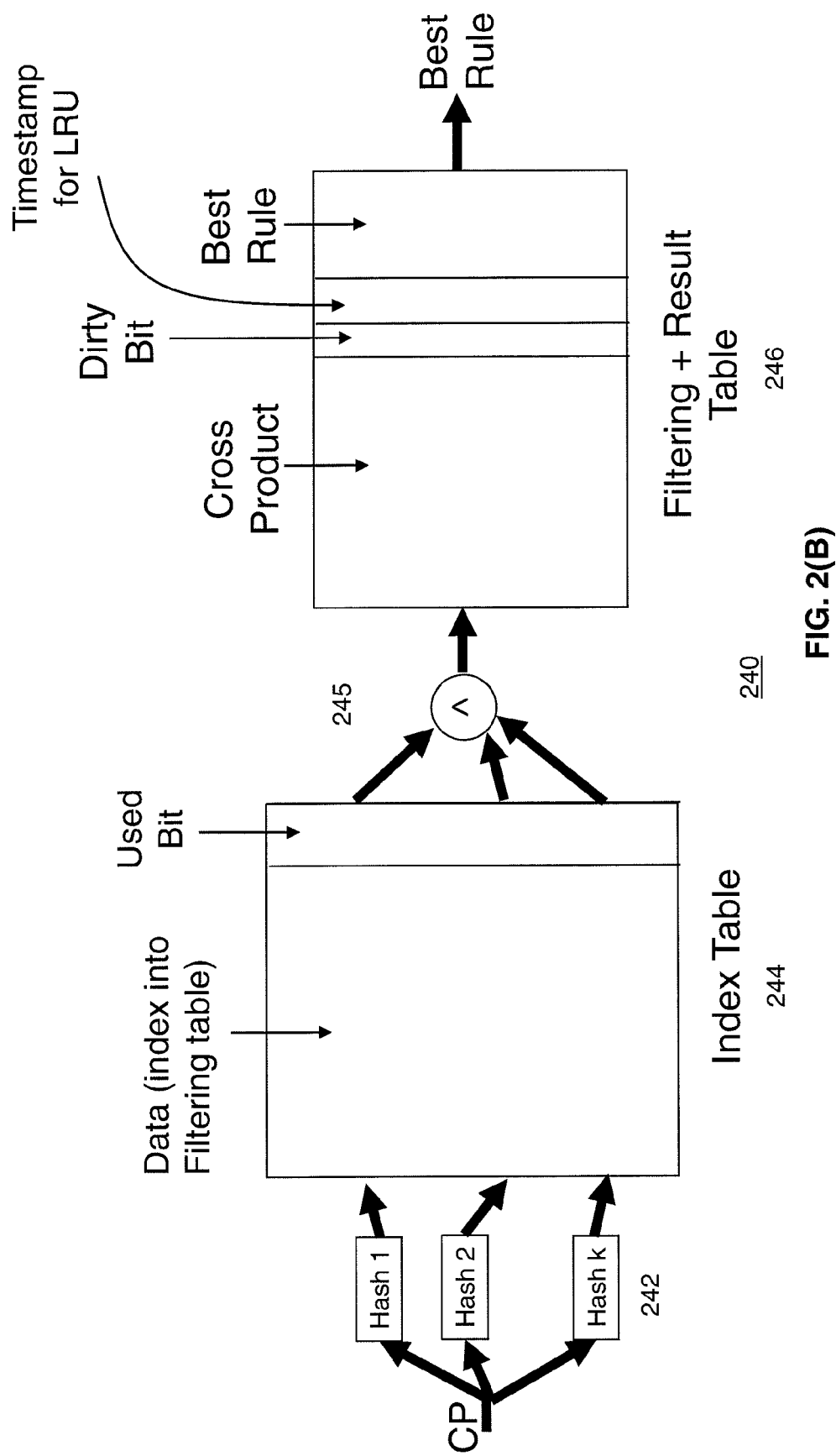
FIG. 2B is a diagram illustrating a preferred embodiment of a cross-product cell.

FIG. 2B shows an advantageous structure for the cross-product cell, which includes a variety of features which are advantageous for lookup and update procedures. As discussed in application Ser. No. 10/909,907, an index table 244 of encoded values is provided which, when combined at 245, output a value addressing the filtering/result table 246. The cross-product is hashed a plurality of times at 242 to produce hash values pointing to the locations in the index table 244. It is advantageous to include in the index table 244, in addition to the data used to index the filtering/result table 246, what the inventors refer to as a "used" bit. The 'used' bit can be used to indicate if any hash function points to the location or not. This bit can be updated by the software engine (CPU) and can be used to quickly identify singletons during cross-product addition. Note that frequent software updates may be required to keep this bit up-to-date. It is advantageous for the filtering table 246 to include a timestamp that is also updated by the software engine and is used to decide which entry to remove based on the above-mentioned least-recently-used policy. The timestamp may be limited to a counter of a certain width. When an entry is accessed, its timestamp is reset to zero while timestamps of all other entries is incremented up to the maximum value. During removal, the first entry with the largest timestamp is removed. Since finding the LRU entry and subsequent replacement may take several cycles, it is preferable to use the offline cross-product table for this purpose. While updates are performed, the online table can continue to process lookups. The filtering and result table 246 contains the cross-products and can also include a dirty bit for each cross-product, and the result, i.e., the best rule corresponding to the cross-product. The dirty bit can be used to quickly identify entries that have been removed.

External Memory Structure. Each cross-product consists of D rule numbers, where D is the number of fields in the packet classifier. Thus, the cross-product width for an packet classifier with 1000 rules and 4 fields is 40 bits. Usually, the cross-product is too wide to consider using a direct-indexed memory structure. It can be therefore preferable to use a hierarchical memory structure, in which the cross-product is divided into smaller portions and each portion is used to index a smaller memory. For instance, a 40-bit cross-product comprising 4 fields can be broken up into a tree of 20 bits cross-products. This solution is illustrated using an example in FIG. 4B.

ACL Updates. When the packet classifier itself is updated, new rules are added and existing rules removed. Adding a new rule R involves adding each entry in R to each of the prefix matching cells that handle the D fields of the packet classifier. However, once the cells of the different fields have been updated, new cross-products must be inserted into the cross-product cells and the external memory. Since the external memory is always kept up-to-date, an update requires enough time to modify the different field prefix matching cells as well as the external memory. New rules do not have to be added to the cross-product cells since subsequent lookups will refresh the cross-product cells from the external memory. Removing a rule R on the other hand involves removing each entry in R from each of the prefix matching cells that handle the D fields of the packet classifier. Once the cells for all the fields are updated, the cross-product is marked as invalid in the cross-product cells (using the above-mentioned dirty bit) as well as the external memory. Thus, the overall update time is predicated by the external memory access time. Designating a certain fraction of operational time for updates, one can perform several hundred updates per second.

Figure 6:
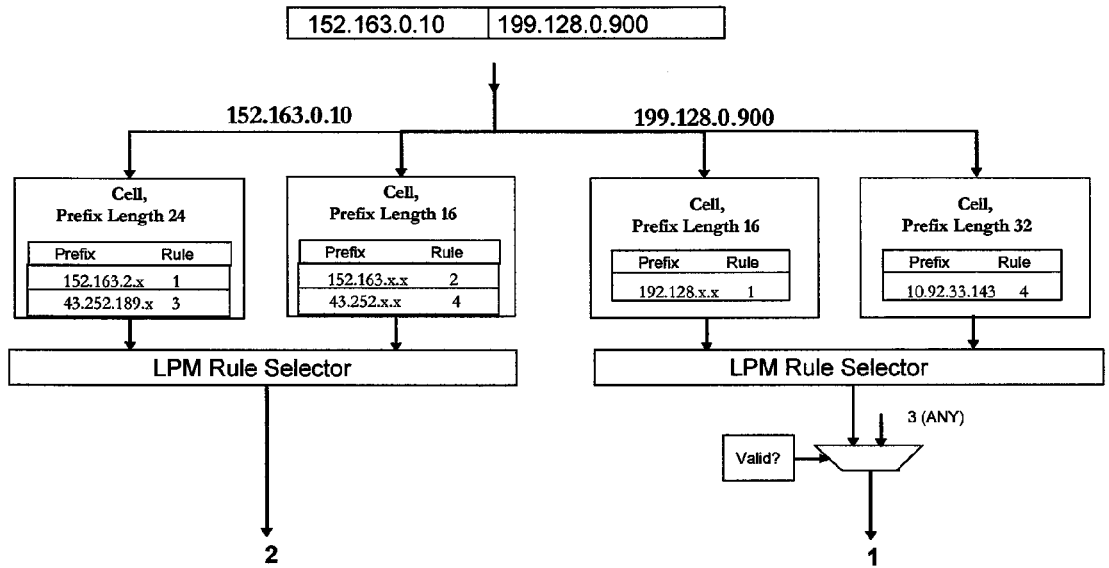
FIGS. 6A and 6B and 7A and 7B illustrate examples of lookup operations.
Figure 6:
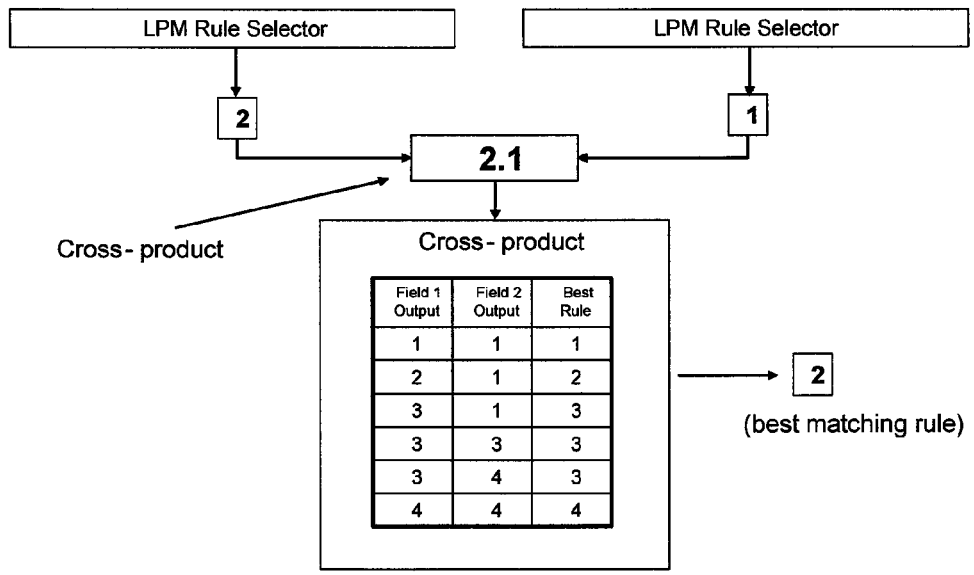
Figure 7:
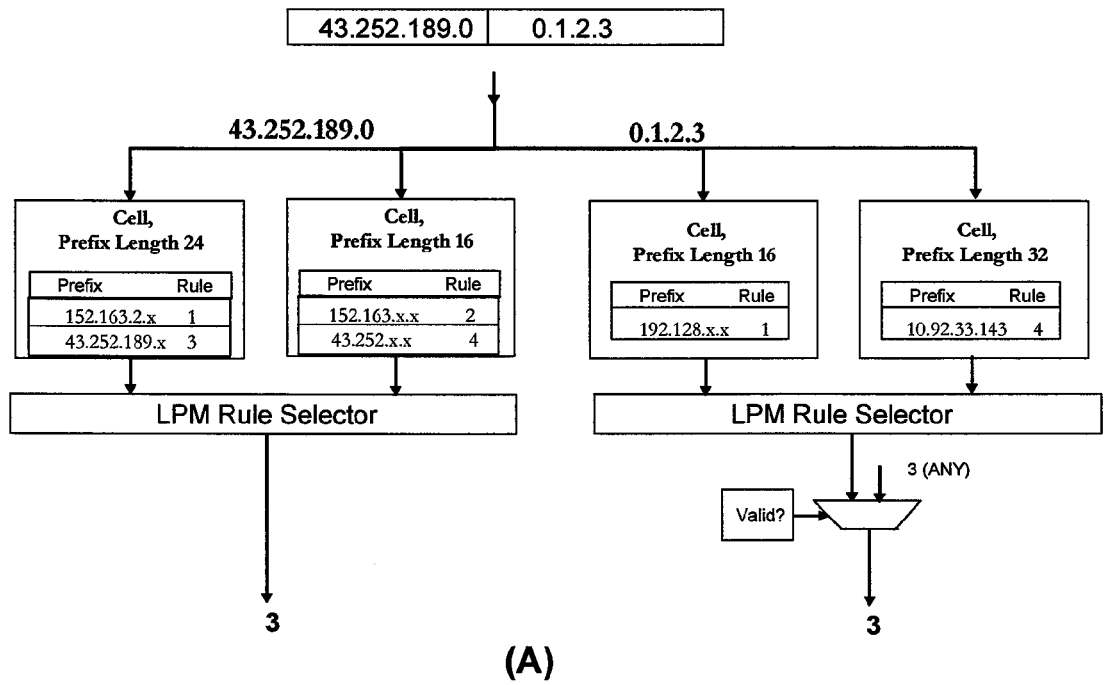
Figure 7:
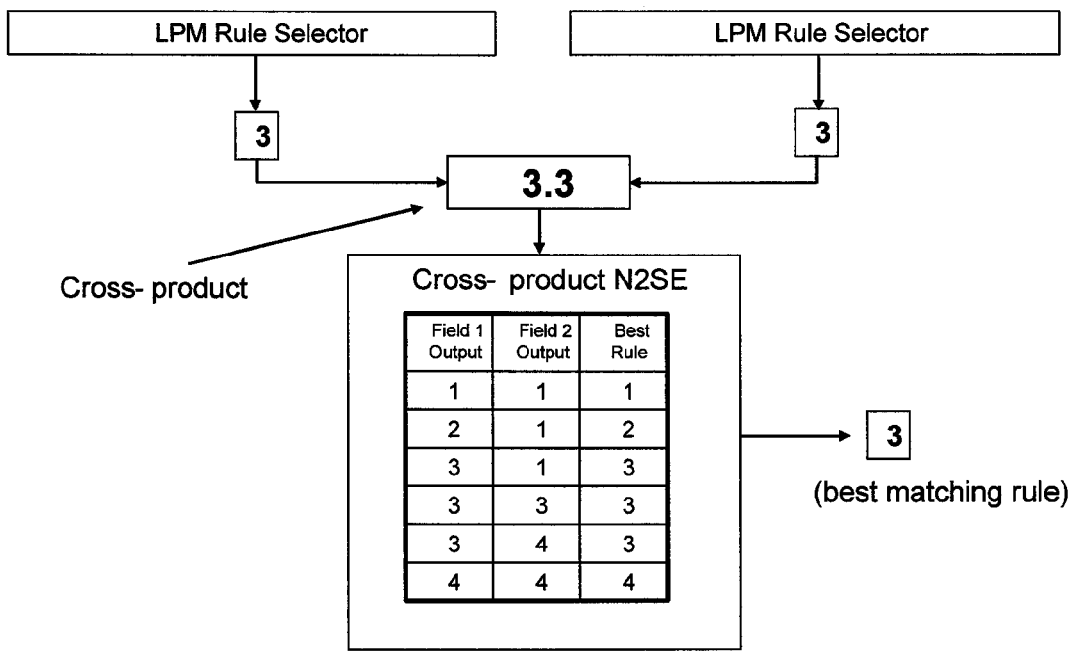

Lookup examples. FIG. 6 through FIG. 7 illustrate various lookup examples. FIG. 6A shows the packet classifier and an example packet header entering the system. Only two fields of the packet header are depicted for clarity. For simplicity, fields 3 and 4 of the header are ignored. In practice, these fields will also be handled by additional cells or other lookup devices. FIG. 6A shows the header making its way through the prefix matching cells of the two fields. The tables that each prefix matching cell is configured with are shown within. Each prefix matching cell provides the matching rule for the prefix from which the rule number corresponding to the longest prefix is selected. In the case of the prefix 152.163.0.10 (field 1), the longest matching prefix is 152.163.x.x (prefix length 16). This prefix corresponds to rule number 2, which is the output of the selector. Similarly, in the case of the prefix 199.128.0.900 (field 2), the longest matching prefix is 199.128.x.x, which corresponds to rule number 1. Note that this prefix also matches rule 2 in field 2, but we designated rule 1 as the representative rule for rules 1 and 2 during setup. FIG. 6B shows the creation of the cross-product (2.1) from the outputs of the N2SE cells. This is used to index the cross-product cell, from which the best rule is obtained. FIGS. 7A and 7B shows an example using the 'any' keyword. In this example, field 2 of the packet header (0.1.2.3) does not match any entry in the corresponding prefix matching cells. Therefore the output MUX corresponding to field 2 indicates a match with 'any' (i.e., Rule 3) thereby making the cross product 3.3, which is looked up in the cross-product cell to produce 3 as the best matching rule.

Figure 8:
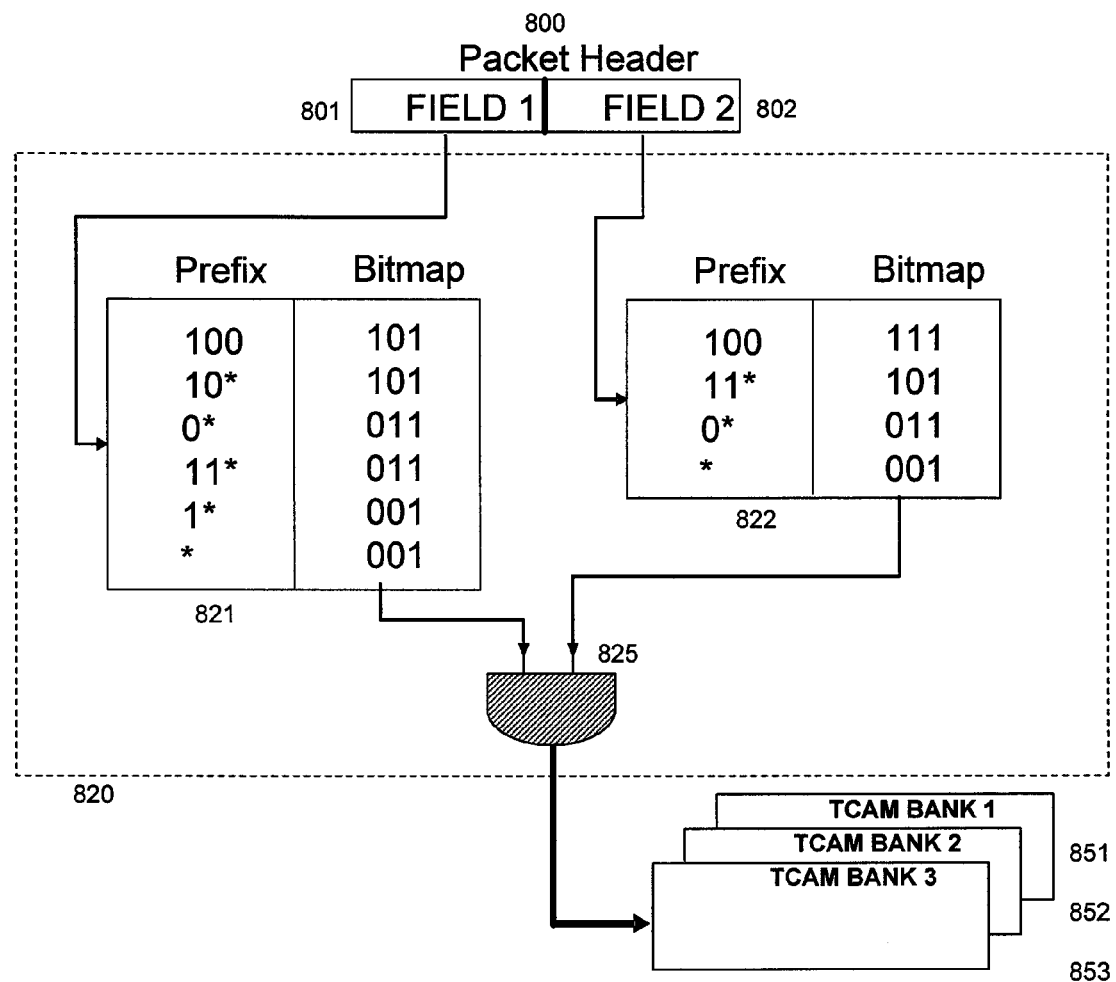
FIG. 8 is a block diagram of an embodiment of a hybrid information retrieval architecture.

Hybrid Architecture. FIG. 8 is a block diagram illustrating a hybrid architecture for packet classification, in accordance with another embodiment of the invention. As depicted in FIG. 8, the hybrid architecture can incorporate conventional content addressable memory (CAM) technology—but in a manner with significant advantages over existing architectures.

In accordance with this embodiment, a novel preprocessing module 820 is provided which is coupled to banks of classification modules 851, 852, 853. The classification modules 851, 852, 853 can be any conventional classification modules, including content-addressable memories such as ternary content-addressable memories (TCAMs). The classification modules can be implemented as a plurality of separate smaller components or, equivalently, as a large classification module separated into banks. For illustration purposes only, it is assumed herein that there are b classification modules and that the b classification modules are TCAMs (or b banks in a large TCAM). The N packet classification rules are stored across the b TCAM banks. Conventional 9techniques can be used to encode and store the rules in the b TCAM banks. As discussed in further detail below, the arrangement of the rules in the TCAM banks can be optimized for this hybrid architecture.

It is assumed that there are D fields for packet classification. FIG. 8 depicts, without limitation, two fields 801, 802 in the incoming packet 800.

The preprocessing module 820 receives the packet 800, processes the packet, and advantageously restricts the packet classification search to one or more of the TCAM banks 851, 852, 853. The preprocessing module 820 operates as follows. Each of the D fields in the packet 800 has a lookup structure 821, 822 in the preprocessing module 820 which associates a prefix in that field with a data representation of which of the TCAM banks 851, 852, 853 includes a lookup value, e.g., a packet classification rule, relevant to that prefix. For example, an advantageous data representation for the lookup structures 821, 822 is a bitmap of size b bits, where b is the number of TCAM banks. Assume that the prefix corresponding to rule r in field f is represented herein by p(r,f). The bitmap can encode the above information on TCAM banks by setting bit k in the bitmap of p(m,f) to a '1' if the rules containing p(r,f) or any of its dependent prefixes are contained in TCAM bank k. Otherwise the bit in the bitmap can be set to a '0'. In other words, the bitmap of p(r,f) indicates all TCAM banks that must be checked if the packet contains prefix p(r,f) in field f. The lookup structures 821, 822 are, as in the embodiments above, preferably implemented using a content-based information retrieval architectures as disclosed in U.S. application Ser. No. 10/909,907, entitled "CONTENT-BASED INFORMATION RETRIEVAL ARCHITECTURE," filed on Aug. 2, 2004, and in U.S. Provisional Application No. 60/740,114, entitled "A STORAGE-EFFICIENT, COLLISION-FREE HASH-BASED PACKET PROCESSING ARCHITECTURE," filed on Nov. 28, 2005, both of which are incorporated by reference herein. The hash-based design therein disclosed can be used to store prefixes of a pre-determined length with associated bitmaps, to provide high speed lookups with a constant query time while providing support for wildcards and fast updates.

As the preprocessing module 820 processes the packet 800 and retrieves associated bitmaps for all of the D fields in the packet 800, the preprocessing module 820 then intersects the bitmaps at 825. Where the bitmaps use the encoding described above, the intersection can be obtained by a simple bitwise AND operation. The intersected bitmap then indicates all possible TCAM banks which store possible rules that the packet can match. The '1's in the intersected bitmap can be used to enable specific TCAM banks where the search for the packet classification rule is conducted. The preprocessing module 820 does not need to store or encode the actual rules associated with the packet. Rather, using the intersected bitmap, the preprocessing module can limit the packet classification search to a subset of all of the TCAM banks.

The architecture thereby can avail itself of all of the advantages of existing components such as TCAMs which significantly improving scalability with regards to power and performance. By restricting search to a small portion of a TCAM (or to fewer smaller TCAMs), there are advantageously fewer parallel searches and power consumption can be reduced and clock speed increased.

Consider, for example, the following example packet classifier which associates different prefixes in different fields with different rules:

| Rule | Field 1 | Field 2 |
|------|---------|---------|
| R1   | 100     | 100     |
| R2   | 10*     | 11*     |
| R3   | 0*      | 100     |
| R4   | 11*     | 0*      |
| R5   | 1*      | *       |
| R5   | *       | *       |

FIG. 8 illustrates how the packet preprocessing module 820 is configured to implement the above example classifier. In FIG. 3, there are illustratively three TCAM banks (b=3). Accordingly, the bitmap has 3 bits, each bit indicating that a specific bank has to be searched. Note that in the second field, there are fewer prefixes (four) than rules (six) because unique prefixes (and their associated bitmaps) alone suffice to fully represent the required information. For example, in field 2 in FIG. 8, the prefix 100 occurs only once in the associated lookup structures 821, 822, but the bitmap corresponding to it indicates that the rules that match 100 occur in all banks, banks 821, 822, 823 of the TCAM. Thus, the bitmap encodes all instances of 100 (rules 1 and 3 or banks 1 and 2) in the classifier.

Updates, such as additions or deletions of packet classification rules, involve two aspects. First, the new rule must be added to or deleted from the TCAM, using known techniques. Second, each prefix in the D fields of the new rule must be added to or removed from the lookup structure in the preprocessing module. Updates to the above-described lookup structure are described in detail in the above-mentioned application Ser. No. 10/909,907 and 60/740,114.

Figure 9:
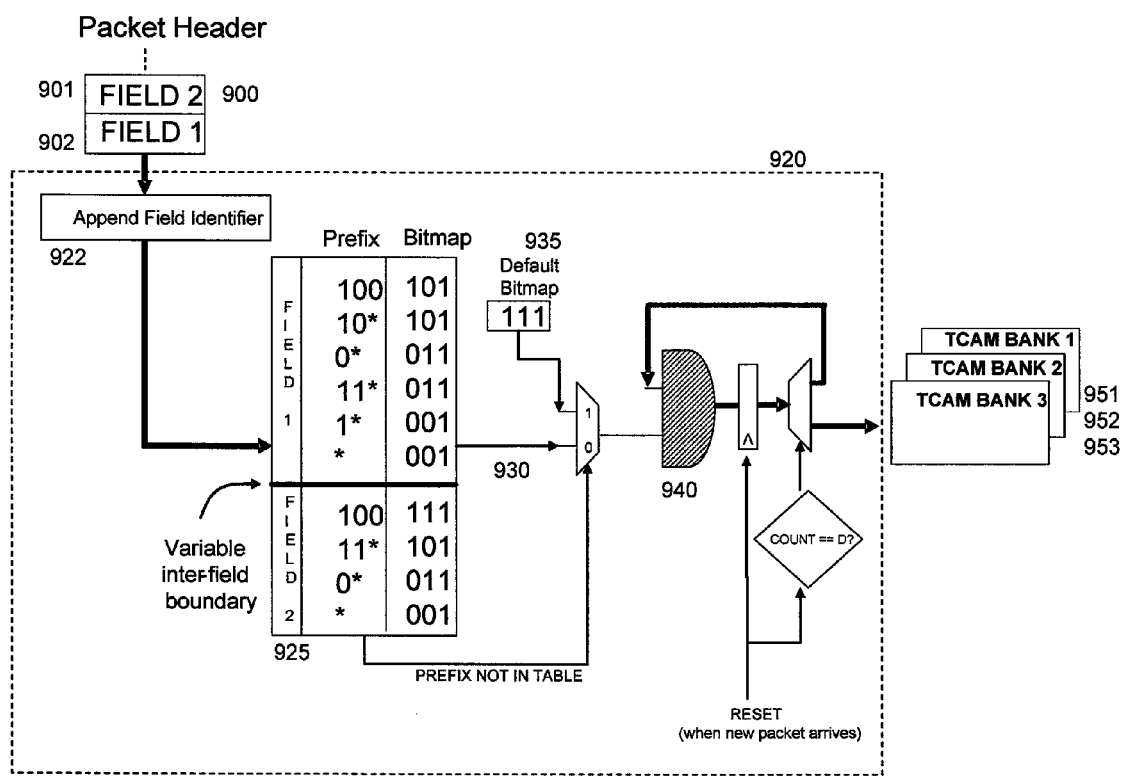
FIG. 9 is a block diagram of another embodiment of the hybrid information retrieval architecture.

It should be noted that the above architecture advantageously does not need to maintain a complete set of bitmaps for a given packet classifier in order to maintain correct operation. In fact, even if the preprocessing module "overflows" in terms of the amount of storage provisioned to maintain the bitmaps, entries in the lookup structures of the preprocessing module can be carefully removed. The preprocessing module can includes a structure to default to a search of all TCAM banks, an example of which is depicted in FIG. 9 and further described below. The preprocessing module can thereby still maintain correct operation (and safe operation since many such classifiers are employed in security-related applications). This may result in excess power dissipation, but the maximum power dissipation would be the power dissipated by the TCAM without the pre-processing module. In the event of an overflow, it is important that the structure of the packet classifier be taken into account when removing lookup entries in the preprocessing module. For example, any prefix entry that is removed should not have dependent prefixes in that field. For example, in the packet classifier represented by the above table, and focusing on field 1, it is possible to remove the entries for "10*", "1*", and "*", but the others cannot be removed without also removing the other dependent prefixes in that field.

Unique Prefixes. It is advantageous to utilize the characteristics of real packet classifiers to improve the storage requirements of the above architecture. We observe that in real classifiers, the total number of unique prefixes in a field is typically much smaller than the total number of rules. Further, we note that while some fields may have a larger number of unique prefixes, other fields typically compensate and have fewer unique prefixes. Thus, it can be advantageous to provision a single storage space for all D fields, and dynamically partition it based on the given classifier. FIG. 9 illustrates such an embodiment. As depicted in FIG. 9, a single hash-based lookup structure 925 is used to store the bitmaps for all prefixes. As noted above, some classifiers might overflow the provisioned storage. That is, the number of unique prefixes across all fields may be larger than the memory provisioned in the hardware. In order to ensure that such classifiers can also be handled, FIG. 9 introduces the above-mentioned modification: if any prefix is not found in the lookup structures of the preprocessing module, the default bitmap is the all 1's bitmap, i.e., we say that the prefix could be present in all TCAM banks. The advantage of this is that it makes the operation of the hybrid architecture correct for any classifier, regardless of its properties. The disadvantage is that there may be excess power dissipation. However, the maximum power dissipation possible is the power dissipated by the TCAM without the pre-processing module.

FIG. 9 shows the hybrid architecture in this low-memory embodiment. The main component is the single memory unit 925 representing the above-mentioned lookup structure that may be dynamically allocated across the D fields. The amount of storage allocated to each field is usually different because the number of unique prefixes in each field can vary. FIG. 9 shows the fields being processed sequentially. Each field's prefix is appended with the field identifier at 922. For example, a prefix p in field f is converted into "fp", which in turn hashes into the Lookup structure unit. The addition of the field identifier f does not adversely affect the storage since the number of fields is typically small and f can usually be represented with 3-4 bits. Instead of appending the field identifier, an alternative method is to have some pre-processing logic that directs a field to its specific portion in memory. The benefit of this approach is that the few additional bits for the field identifier may be saved. However, the downside is that each lookup structure unit 925 is smaller and more restrictive: this has the effect of increasing setup times for the lookup structure 925. At the output of the lookup structure tables 925 is a multiplexer 930 that outputs the default all 1's bitmap if the prefix is not present in the table. Each field bitmap is bitwise AND'ed at 940 with bitmaps of other fields of the same packet to produce the final bitmap. A counter can be used to bitwise AND exactly D bitmaps before resetting to process a new packet.

Locality. Another optimization which can be utilized with the hybrid architecture pertains to locality of accesses. Existing packet classifiers are accessed with considerable temporal locality. For example, if an incoming packet header matches rules R1, R2 and R3, it is very likely the same packet header will occur again several times in the near future, thereby accessing the same rules. Further, for a router in a specific location, some packet headers will likely occur very often. Accordingly, it an be advantageous to analyze the traffic handled by a packet classifier to determine which rules are more likely to be accessed than others. All rules in the classifier can then be sorted based on their expected frequency of access. Rules (their prefixes) are then inserted into the lookup structure of the preprocessing module based on this sorting with preference given to the frequently-accessed rules. Thus, infrequently accessed rules may not need to be present in lookup structure (subject to requirement of dependent prefixes mentioned above) which will result in the entire TCAM being searched if packet headers match those rules. However, for the frequently-accessed rules, the use of the pre-processing module will result in TCAM power savings.

Rule arrangement. It should be noted that the number of 1's in the bitmap of a prefix strongly depends on the arrangement of rules within the TCAM. For instance, say prefix P has d dependent prefixes in some field. If these d prefixes are scattered across d different TCAM banks, then P's bitmap will contain d 1's. A large number of 1's in a bitmap causes the following two problems:

The final bitmap will contain more 1's implying more TCAM banks must be searched in order to find the best matching rule. This has an adverse effect on power dissipation.

The probability of false matches increases. A false match happens when two fields match different rules that are in the same bank. In this case, the TCAM is searched only to discover that no rule actually matches.

Thus, reducing the number of 1's in the bitmap is beneficial. In order to do this, it is preferable to arrange the rules such that, as far as possible, rules corresponding to dependent prefixes in every field are contained in a single bank. Thus, if two rules contain dependent prefixes in any of their fields, they will likely be in the same bank. Thus, the rules that a packet matches will be spread across as few banks as possible.

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow and their structural and functional equivalents.

What is claimed is:

1. An information retrieval architecture for performing a multi-dimensional search for a lookup value associated with a set of input values, the set of input values organized into one or more fields, the information retrieval architecture comprising:

a plurality of classification modules, each classification module storing the lookup values, each lookup value being associated with a set of input values; and a preprocessing module which receives a set of input values and selectively limits search of the plurality of classification modules to a subset of the classification modules, the preprocessing module further comprising one or more lookup structures associating input values with a data representation identifying which of the plurality of classification modules to search to retrieve the lookup value associated with the set of input values, the lookup structure further comprising a hashing module that receives the input value and generates a plurality of hashed values from the input value, a first table storing a plurality of encoded values, each hashed value generated from the input value corresponding to a location in the table of an encoded value, and a second table storing a plurality of data representations, where the first table is constructed so that the encoded values, obtained from the hashed values generated from an input value, encode an output value such that the output value cannot be recovered from any single encoded value and such that the output value selects a data representation in the second table, the data representation identifying which of the plurality of classification modules to search to retrieve the lookup value.

2. The information retrieval architecture of claim 1 wherein the preprocessing module is arranged to default to a data representation identifying that all of the plurality of classification modules are to be searched for any lookup value associated with input values not found in the lookup structures of the preprocessing module.

3. The information retrieval architecture of claim 2 wherein the preprocessing module uses a single lookup structure for different fields of input values so as to take advantage of a number of unique input values for the different fields of input values.

4. The information retrieval architecture of claim 2 wherein the preprocessing module stores data representations in the lookup structures based on which are more likely to be accessed.

5. The information retrieval architecture of claim 1 wherein the lookup structure is a constant query-time lookup structure.

6. The information retrieval architecture of claim 1 wherein lookup values stored in the classification modules are arranged so as to minimize parallel searches through the plurality of classification modules as selectively limited by the preprocessing module.

7. The information retrieval architecture of claim 1 wherein if an update is made to lookup values stored in the classification modules, an update is conducted to the lookup structure in the preprocessing module.

8. The information retrieval architecture of claim 1 wherein the data representation identifying which of the plurality of classification modules to search to retrieve the lookup value associated with the input value is a bitmap where each bit represents a different classification module.

9. The information retrieval architecture of claim 1 wherein each bit in the data representation is used in identifying which of the plurality of classification modules to search.

10. The information retrieval architecture of claim 1 wherein each lookup structure in the preprocessing module is used for a different field of input values and wherein the data representations from each lookup structure are combined to generate a final data representation identifying which of the plurality of classification modules to search to retrieve the lookup value associated all of the input values in the different fields.

11. The information retrieval architecture of claim 1 wherein the data representation identifying which of the plurality of classification modules to search to retrieve the lookup value associated with the input value is a bitmap where each bit represents a different classification module and wherein the data representations are combined by intersecting the bitmaps.

12. The information retrieval architecture of claim 1 wherein the input values are information in a packet header and wherein the lookup values are packet classification rule identifiers.

* * * * *